UNITED STATES PATENT OFFICE.

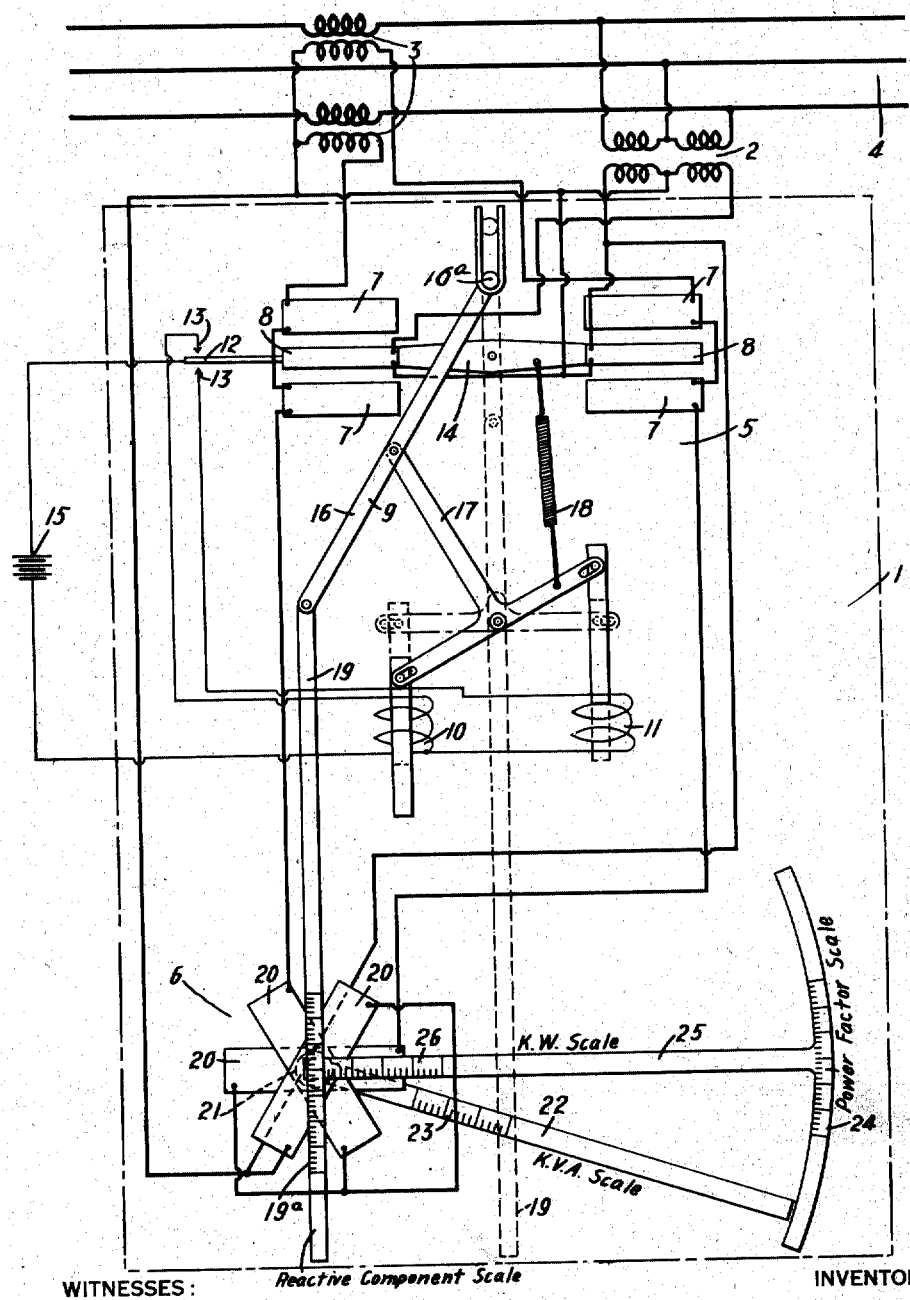

STEPHEN Q. HAYES, OF PITTSBURGH, PENNSYLVANIA, ASSIGNOR TO WESTINGHOUSE ELECTRIC AND MANUFACTURING COMPANY, A CORPORATION OF PENNSYLVANIA.

ELECTRICAL MEASURING INSTRUMENT.

1,278,921.  Specification of Letters Patent.  Patented Sept. 17, 1918.

Application filed June 5, 1916. Serial No. 101,733.

*To all whom it may concern:*

Be it known that I, STEPHEN Q. HAYES, a citizen of the United States, and a resident of Pittsburgh, in the county of Allegheny and State of Pennsylvania, have invented a new and useful Improvement in Electrical Measuring Instruments, of which the following is a specification.

My invention relates to electrical measuring instruments and particularly to instruments that are adapted to indicate the power-factor, the power and the reactive components of the energy and the volt-amperes traversing the circuits to which they are connected.

The object of my invention is to provide an instrument of the above character that shall be easily and cheaply constructed, and efficient and reliable in its operation.

In the carrying out of my invention, I provide a wattmeter, preferably of the Kelvin-balance type, and a power-factor meter. The movable member of the wattmeter has a scale marked thereon and coöperates with a substantially straight stationary scale and a scale that is marked on the movable member of the power-factor meter. The movable member of the power-factor meter is adapted also to coöperate with a stationary circular scale. The power-factor meter is so disposed that its movable member is pivoted adjacent one end of the stationary straight scale. Thus, the scales and the movable members of the meters are adapted to coöperate with each other to indicate the power-factor, the power and reactive components of the energy and the volt-amperes traversing the circuit to which the instrument is connected.

The single figure of the accompanying drawing is a diagrammatic view of an electrical measuring instrument embodying my invention.

An electrical measuring instrument 1 is operatively connected, through voltage transformers 2 and current transformers 3, to an electrical circuit 4. The instrument comprises, in general, a wattmeter 5, preferably of the Kelvin-balance type, and a power-factor meter 6.

The wattmeter 5 comprises stationary current coils 7 that are operatively connected to the transformers 3, movable voltage coils 8 that are operatively connected to the transformers 2, a parallel-motion linkage mechanism 9, actuating electromagnets 10 and 11 therefor and movable and stationary contact members 12 and 13 for controlling the operation of the electromagnets 10 and 11. The movable contact member 12 is mounted on the movable member 14 of the wattmeter 5 upon which the movable coils 8 are also mounted and is electrically connected to one terminal of a source 15 of electromotive force. The other terminal of the source 15 of electromotive force is operatively connected to one terminal of each of the windings of the electromagnets 10 and 11. The remaining terminals of the windings of the electromagnets 10 and 11 are connected to the respective stationary contact members 13. The linkage mechanism 9 comprises a pivotally mounted member 16 having a vertically movable pivotal point 16$^a$ and a pivotally mounted T-shaped member 17 that is connected, at the outer end of one of its arms, to the lever 16 and, at the outer end of its other arms, through pin-and-slot connections, to the movable members of the electromagnets 10 and 11. The member 17 is connected, through a spring 18, to the movable member 14 of the meter 5. The free end of the lever 16 carries a pivotally mounted member 19 that is provided with a scale 19$^a$. With such an arrangement, the member 19 is adapted to move laterally, without longitudinal movement, in accordance with the energy traversing the circuit 4.

The power-factor meter 6 comprises a plurality of current coils 20 and a potential coil 21. The current coils 20 are disposed around the potential coil 21 and are operatively connected to the transformers 3. The potential coil 21 is operatively connected to the transformers 2 and is so disposed with respect to the coils 20 that the movable member 22 is adapted to assume a predetermined position when the phase-angular relation between the current and the voltage in the circuit 4 has a predetermined value. The meter 6 may be constructed as set forth in the Conrad Patent No. 695,913, granted March 25, 1902 to the Westinghouse Electric and Manufacturing Company. However, any other suitable form of power-factor meter may be used. The movable member 22 of the power-factor meter 6 is provided with a scale 23 and is adapted to coöperate with a circumferentially curved scale 24. Thus, the member 22, in coöperation with the scale 24, indicates the power-factor of the circuit 4.

A substantially straight stationary member 25 is provided with a scale 26 that is adapted to coöperate with the movable member 19 of the meter 5 to indicate the power-component or the energy traversing the circuit 4. The movable member 22 of the meter 6 is so disposed that its pivotal point registers with one end of the scale 25. Thus, the scale 23, in coöperation with the movable member 19, will indicate the volt-amperes traversing the circuit 4, and the scale 19$^a$, in coöperation with the movable member 22 and the stationary scale 25, will indicate the reactive component of the energy traversing the circuit 4.

My invention is not limited to the particular types of meters illustrated, as many other types of meters may be utilized to actuate the scales to produce the desired results without departing from the spirit and scope of my invention, as set forth in the appended claims.

I claim as my invention:

1. A measuring instrument for an electric circuit comprising a wattmeter, a power-factor meter, movable scales therefor, and stationary scales for coöperating with the movable scales to indicate the power factor, the power and the reactive component of the apparent power and the volt-amperes traversing the circuit.

2. A measuring instrument for an electric circuit comprising a wattmeter, a power-factor meter, movable scales therefor, and stationary scales for coöperating with the movable scales to indicate the power and reactive components of the apparent power traversing the circuit and the vector sum of these two quantities.

3. A measuring instrument for an electric circuit comprising a scale adapted to move laterally in accordance with the energy traversing the circuit, a rotatable scale adapted to turn in accordance with the power-factor of the circuit, and a stationary scale, said scales being adapted to coöperate with each other to indicate the power and the reactive-components of the energy traversing the circuit and the vector sum of these values.

4. A measuring instrument for an electric circuit comprising a straight and a curved stationary scale, a scale disposed at right angles to the straight scale and adapted to move laterally along the straight stationary scale in accordance with the power-component of the energy traversing the circuit, and a rotatable scale pivoted at one end of the straight stationary scale and adapted to turn in accordance with the power-factor of the circuit, said scales being adapted to coöperate with each other to indicate the power-factor, the power and reactive-components of the energy and the volt-amperes traversing the circuit.

5. A measuring instrument for an electric circuit comprising a stationary scale, a scale disposed at right angles thereto and adapted to move along the stationary scale in accordance with the power-component of the energy traversing the circuit, and a rotatable scale pivoted at one end of the stationary scale and adapted to turn in accordance with the power-factor of the circuit, said scales being adapted to coöperate with each other to indicate the power and the reactive-component of the energy traversing the circuit and the vector sum of these two values.

6. A measuring instrument for an electric circuit comprising a substantially straight stationary scale, a curved stationary scale, a power-factor meter having a movable member provided with a scale, and a wattmeter having a movable member provided with a scale, said movable member of the power-factor meter being adapted to coöperate with the curved stationary scale to indicate the power-factor of the circuit and with the movable member of the wattmeter to indicate the volt-amperes traversing the circuit, the movable member of the wattmeter being adapted to coöperate with the straight stationary scale to indicate the power-component of the energy traversing the circuit, and the scale on the movable member of the wattmeter being adapted to coöperate with the movable member of the power-factor meter to indicate the reactive-component of the energy traversing the circuit.

7. A measuring instrument for an electric circuit comprising a scale adapted to be actuated in accordance with the power traversing the circuit, a second scale adapted to be actuated in accordance with the power factor of the circuit, and a stationary scale, said scales being adapted to coöperate with each other to indicate the various components of the apparent power traversing the circuit.

8. A measuring instrument for an electric circuit comprising a scale adapted to be actuated in accordance with the power traversing the circuit, a second scale adapted to be actuated in accordance with the power factor of the circuit, and a stationary scale, said scales being adapted to coöperate with each other to indicate the reactive component of the power traversing the circuit, 9. A measuring instrument for an electric circuit comprising a scale adapted to be actuated in accordance with the power traversing the circuit, a second scale adapted to be actuated in accordance with the power factor of the circuit, and a stationary scale, said scales being adapted to coöperate with each other to indicate the apparent power traversing the circuit.

In testimony whereof, I have hereunto subscribed my name this 26th day of May, 1916.

STEPHEN Q. HAYES.